United States Patent [19]

Hildreth

[11] 3,816,093

[45] June 11, 1974

[54] HALOGENATING METHOD OF REDUCING IRON AND TITANIUM CONTENT OF ALUMINA-SILICA ORE

[75] Inventor: Clarence L. Hildreth, Baton Rouge, La.

[73] Assignee: Ethyl Corporation, Richmond, Va.

[22] Filed: May 11, 1972

[21] Appl. No.: 252,214

Related U.S. Application Data

[63] Continuation of Ser. No. 41,610, May 28, 1970, abandoned.

[52] U.S. Cl............................ 75/1, 75/111, 75/112, 75/148
[51] Int. Cl. ......................... C22b 1/08, C22b 1/02
[58] Field of Search ................... 75/1, 112, 111, 148

[56] References Cited
UNITED STATES PATENTS

| | | | |
|---|---|---|---|
| 2,755,178 | 7/1956 | Rasmussen | 75/148 X |
| 2,933,373 | 4/1960 | Love et al. | 75/1 X |
| 3,216,817 | 11/1965 | Hartford et al. | 75/112 X |
| 3,240,557 | 3/1966 | Lerner | 75/112 X |
| 3,305,300 | 2/1967 | McBrayer | 75/111 X |
| 3,418,074 | 12/1968 | Sargeant | 75/112 X |
| 3,484,198 | 12/1969 | Block et al. | 23/200 |

*Primary Examiner*—A. B. Curtis
*Attorney, Agent, or Firm*—Donald L. Johnson; John F. Sieberth; Paul H. Leonard

[57] ABSTRACT

A method of beneficiating or upgrading aluminum-silicate or alumina-silica ores, especially clays containing substantial amounts of minerals such as kyanite, diaspore and the like, wherein the ore is heated in a non-fluidized bed to a relatively high temperature in the presence of a carbonaceous reducing agent and treated with chlorine and/or bromine.

5 Claims, No Drawings

HALOGENATING METHOD OF REDUCING IRON AND TITANIUM CONTENT OF ALUMINUM-SILICA ORE

CROSS-REFERENCE TO RELATED APPLICATION

This application is a continuation-in-part of U.S. Pat. application Ser. No. 41,610 filed on May 28, 1970 and subsequently abandoned.

BACKGROUND OF THE INVENTION

The present invention is in the broad field of metallurgy and in particular non-ferrous metallurgy. The invention especially relates to the beneficiation or chemical treatment of alumina-silica or aluminum-silicate ores and/or ores containing compounds of both aluminum and silicon for production of concentrates for electrothermal or carbothermic manufacture of aluminum-silicon alloys.

Natural alumina-silica or aluminum-silicate ores, especially clays such as diaspore clay and kyanite clay, contain large amounts of aluminum in oxidic form and also contain substantial quantites of iron and titanium generally in oxidic form although sometimes as sulfides or other entities. In the production of aluminum-silicon alloys from these high alumina bearing ores, the iron and titanium metals produced by co-reduction with the aluminum and silicon are harmful impurities.

It has been found [N. I. Eremin, A. S. Bessonova, and V. G. Brin, Tr. Vses. Alyumin-Magnievo Inst., 62 (1968)] that chlorination of kaolin and other types of alkali-free alumino-silicate raw materials is the most effective method for production of cncentrates for electrothermal manufacture of aluminum-silicon alloys. Heating of the kaolin to 700°–1,300° C followed by passage of chlorine is recommended by Takamura Suzuki in Japanese Pat. No. 135/54, Feb. 11, 1954.

A method of removing iron by heating kaolins with carbonaceous materials in a current of chlorine was proposed by M. E. Nordberg in U. S. Pat. No. 2,141,444 issued Dec. 27, 1938. The possibility of volatilization of iron compounds from kaolins by means of chlorine was noted by T. Haase, Silikattechnik, 9 (1952), and by means of hydrogen chloride by V. I. Spitsyn, Chlorination of Oxides and Nitric Compounds (in Russian) (1931).

Kaolin minerals include kaolinite, dickite, nacrite, onauxite and halloysite-endellite. These minerals contain quantities of aluminum and silicon usually in the form of $Al_2O_3$ and $SiO_2$, respectively, or as combinations of these oxides such as $(Al_2O_3)_x \cdot (SiO_2)_y \cdot zH_2O$, where $x$, $y$ and $z$ are normally small whole numbers such as 0, 1, 2, 3, etc. The alumina seldom exceeds 40 percent and generally ranges from about 32 percent to about 39 percent of the kaolin. Silica generally comprises about 40 percent to about 53 percent. Iron in the form of $Fe_2O_3$ and occasionally FeO comprise less than 2 percent and usually from about 0.3 percent to about 1.7 percent. Titanium ($TiO_2$) content ranges up to about 3 percent from a low of about 0.2 percent. Kaolin thus contains relatively small amounts of iron and titanium and even smaller amounts of alkali metals and chlorination has been reported to have achieved some reductions of these impurities in these relatively pure compounds. The process is not known to have been used commercially.

High-alumina clay minerals such as diaspore, and the like, although containing over 50 percent alumina, contain substantially larger amounts of iron and titanium, frequently about 8 and 6 percent, when calculated as $Fe_2O_3$ and $TiO_2$, respectively, or even higher in some cases. In order for such a mineral or natural ore to be used in the manufacture of aluminum-silicon alloys, the iron and titanium content must be substantially reduced, and ideally to something less than 1 percent of the ore on the same basis.

It is therefore a primary object of the present invention to provide a means for beneficiating or upgrading natural ores containing large amounts of alumina, smaller amounts of silica and substantial amounts of undesirable compounds of iron and titanium.

Another object of the present invention is to reduce the iron and titanium content of diaspore clay by treating such clay in the presence of a carbonaceous reducing agent with chlorine and/or bromine at temperatures of from about 650° C to about 1,200° C.

Other objects and advantages of the present invention will become readily apparent from the hereinafter description of the invention.

SUMMARY OF THE INVENTION

It has been unexpectedly discovered that aluminosilicate ores or natural clays containing large quantities of aluminum and substantial quantities of iron and titanium can be beneficiated and/or their iron and titanium content substantially reduced by treating the ore or clay with chlorine and/or bromine in the presence of carbon or a carbonaceous reducing agent at temperatures ranging from about 650° C to about 1,200° C. The addition of the carbonaceous reducing agent to the ore permits the use of lower temperatures to achieve the same reduction of impurities as when chlorine alone was used. Higher temperatures up to that at which $Al_2O_3$ or $SiO_2$ is unduly attacked may be used, but little additional reduction of impurities is obtained. Although bromine alone is ineffective for iron and titanium reduction, excellent results are obtained when carbon is added to the ore.

Optimum results are obtained at temperatures of from about 800° C to about 1,000° C.

Although the present invention is particularly directed to those natural clays containing substantial quantities of diaspore or kyanite minerals, other alumina-silica ores of high alumina content may be used. Some examples of other minerals are sillimanite, andalusite, mullite, nepheline, pyrophyllite, gibbsite, boehmite and cliachite. Diaspore clay comprises chiefly diaspore and boehmite, both $Al_2O_3 \cdot H_2O$.

Although the clay may be heated prior to being contacted with the chlorine or bromine gas, it is preferred that the heating and chlorination occur simultaneously.

In the preferred form of the invention, the ore is pre-crushed to the required mesh size. A mesh size of about −50 mesh (U. S. Sieve Series) or smaller is essential to effective titanium and iron removal. Smaller mesh sizes produce optimum results.

The carbon or carbonaceous reducing agent is preferably about the same particle size as that of the ore and is intimately mixed with the ore. An excess of carbon is desired when the ore is to be used subsequently in a carbothermic reduction.

Little or no reduction of iron and titanium is obtained when iodine is used in lieu of chlorine or bromine. Fluorine has detrimental or deleterious effects on the ore and is undesirable.

DESCRIPTION OF THE PREFERRED EMBODIMENT

In the preferred form of the invention, diaspore clay of relatively fine mesh (about −400 mesh to about −50 mesh, U. S. Sieve Series) is mixed with a carbonaceous reducing agent (50– 100 percent excess based on that required to react only with $Fe_2O_3$ and $TiO_2$) and the mixture is placed in a suitable reactor in a furnace and heated to a temperature in excess of 650° C and preferably to about 800° to 1,000° C. A stream of chlorine gas or alternatively bromine gas is introduced into the furnace through a suitable opening therein, passed therethrough in such a fashion as to provide intimate contact with the previously charged hot finely divided mixture of diaspore clay and carbonaceous reducing agent such as calcined petroleum coke, and the volatile products of reaction plus any excess chlorine or bromine passed out a second opening in the furnace. The clay is treated or chlorinated or brominated for a period of time which will vary depending on temperature, particle size, amount of iron and titanium present in the clay, degree of reduction of iron and titanium desired and rate of flow of chlorine or bromine, but conveniently and frequently for about ½ to 4 hours. The greater the titanium quantity in the ore, the longer heating period required. The residual ore is then ready for the next processing step.

Although calcined petroleum coke has produced excellent results, other suitable forms of carbon may be used. These include, but are not limited to, coal, coke, graphite and lamp black.

Carbon permits the use of considerably less chlorine and at lower temperatures thus effecting a substantial economic advantage over the use of chlorine alone for iron and titanium reduction. Additionally, carbon unexpectedly permits bromine to be used, whereas bromine when used alone is substantially ineffective.

A number of laboratory tests have been made wherein various sizes and types of clay minerals were treated with chlorine and bromine in the presence of a carbonaceous reducing agent. The results of these tests are set forth hereinafter.

GENERAL PROCEDURE

1. A mixture of mineral or ore and calcined petroleum coke was placed in a ceramic boat and the boat was placed in a high temperature glass or ceramic tube capable of withstanding a chlorine or bromine atmosphere at operating temperatures. The tube was inserted in a tube furnace and heated to the desired temperature. The temperature was measured using a chromel-alumel thermocouple inside a Vycor protection tube with the end of the protection tube located over the boat. A stream of chlorine or bromine was passed through the tube, over the boat and out the other end of the tube. After the test the residual ore was cooled and weighed. Extractions were calculated by determining the weight of each material in the feed and in the product.

2. A mixture of mineral or ore and calcined petroleum coke was placed in a vertical tube of Vycor with a Vycor frit near the bottom. The tube was inserted in a vertical furnace. A stream of inert gas, usually argon, was passed through the bed. Temperature was measured with a chromel-alumel thermo-couple encased in a Vycor protection tube inserted down the reaction tube with the end of the protection tube below the top of the bed of mineral. After the desired temperature was attained, the inert gas was shut off and chlorine and/or bromine turned on. At the end of the test, the reactor was cooled and the results calculated as above.

The temperature may be measured by any convenient method. The tube may be of high temperature glass, ceramic or other material. In lieu of the fritted disc, any other suitable means for producing increased uniformity of gas flow in the horizontal periphery may be used. In addition to argon, nitrogen, helium or other similar inert gases may be employed.

Chlorine, bromine and/or the mixture of chlorine or bromine and inert gas is passed through the ore at a sufficient rate to be effective.

EXAMPLE A

Following General Procedure 1, a number of tests were made wherein small samples of diaspore ore were chlorinated with and without carbon. The results of these tests are set forth in Tables I, II, III and IV.

TABLE I

Chlorination of 200/325 Mesh Diaspore at 650°C

Analyses

|  | Starting Ore, % | Chlorinated without Carbon % | Chlorinated with 70% Excess Carbon % |
|---|---|---|---|
| $Al_2O_3$ | 58.70 | 72.6 | 68.6 |
| $SiO_2$ | 12.25 | 13.7 | 13.5 |
| $Fe_2O_3$ | 7.10 | 3.1 | 3.2 |
| $TiO_2$ | 4.45 | 5.3 | 2.5 |

Extraction

|  | Chlorinated Without Carbon % | Chlorinated with 70% Excess Carbon % |
|---|---|---|
| $Al_2O_3$ | 2.0 | 8.8 |
| $SiO_2$ | 11.4 | 14.1 |
| $Fe_2O_3$ | 65.3 | 64.8 |
| $TiO_2$ | 6.0 | 56.0 |

TABLE II

Chlorination 200/325 and 100/150 Mesh Diaspore With Carbon at 650°C

Analyses

|  | 200/325 Mesh (70% Excess C) | | 100/150 Mesh (85% Excess C) | |
|---|---|---|---|---|
|  | Starting Ore, % | Product % | Starting Ore, % | Product % |
| $Al_2O_3$ | 58.70 | 68.6 | 56.50 | 69.4 |
| $SiO_2$ | 12.25 | 13.5 | 11.05 | 16.3 |
| $Fe_2O_3$ | 7.10 | 3.2 | 5.70 | 2.7 |
| $TiO_2$ | 4.45 | 2.5 | 4.65 | 3.1 |

Extraction of Iron and Titanium

|  | % 200/325 Mesh | % 100/150 Mesh |
|---|---|---|
| $Fe_2O_3$ | 64.8 | 61.4 |
| $TiO_2$ | 56.0 | 45.7 |

TABLE III

Chlorination of 100/150 Mesh Diaspore With Carbon at 650° and 750°C

Analyses

|  | Starting Ore, % | Product (85% Excess C), % 650°C | 750°C |
|---|---|---|---|
| $Al_2O_3$ | 56.50 | 69.4 | 67.6 |
| $SiO_2$ | 11.05 | 16.3 | 15.0 |
| $Fe_2O_3$ | 5.70 | 2.7 | 2.0 |
| $TiO_2$ | 4.65 | 3.1 | 1.8 |

Extraction of Iron and Titanium

|  | 650°C | 750°C |
|---|---|---|
| $Fe_2O_3$ | 61.4 | 71.9 |
| $TiO_2$ | 45.7 | 69.3 |

TABLE IV

Chlorination of 100/150 Mesh Diaspore at 750°C with Varying C Contents

Analyses

|  | Starting Ore, % | No Carbon % | Product Excess Carbon, % 11% | 85% | 400% |
|---|---|---|---|---|---|
| $Al_2O_3$ | 56.50 | 70.2 | 64.5 | 67.6 | 66.5 |
| $SiO_2$ | 11.05 | 15.3 | 14.4 | 15.0 | 14.1 |
| $Fe_2O_3$ | 5.70 | 2.5 | 2.1 | 2.0 | 2.0 |
| $TiO_2$ | 4.65 | 4.6 | 3.4 | 1.8 | 1.6 |

Extraction of Iron and Titanium

|  | No Carbon % | Excess Carbon, % 11% | 85% | 400% |
|---|---|---|---|---|
| $Fe_2O_3$ | 64.3 | 70.2 | 71.9 | 71.4 |
| $TiO_2$ | 19.3 | 40.7 | 69.3 | 72.1 |

Table I shows that at 650° C the use of carbon in the chlorination of diaspore markedly increases the removal of $TiO_2$. The carbon represented approximately 70 percent excess over that required for $Fe_2O_3$ plus $TiO_2$. Removals of $Fe_2O_3$ and $TiO_2$ were fair.

Table II shows that switching from 200/325 mesh ore to 100/150 mesh ore has the effect of a slight decrease in both $Fe_2O_3$ and $TiO_2$ extractions.

Table III indicates a considerable improvement in going from 650° to 750° C with the 100/150 mesh ore using 85 percent excess carbon. $Fe_2O_3$ and $TiO_2$ levels are good and relatively close to the desired 1.0 percent or lower goal.

Table IV shows that carbon helps $TiO_2$ extraction considerably, and excess carbon is desirable at 750° C. Some carbon or an excess of carbon had slightly beneficial effects as regards $Fe_2O_3$ extraction.

EXAMPLE B

Using General Procedure 1, samples of diaspore clay of 200/325 mesh were chlorinated with carbon (85 percent excess based on $Fe_2O_3$ and $TiO_2$) and without carbon at 900° C for 1 hour and 2 hours. The results of these tests are recorded hereinafter in Table V.

TABLE V

Chlorination Without Carbon at 900°C

| Constituent | Starting Ore, % | 1 Hour: Composition, % | Extraction, % | 2 Hours: Composition, % | Extraction, % |
|---|---|---|---|---|---|
| $Al_2O_3$ | 58.70 | 70.6 | 6.4 | 74.9 | 5.8 |
| $SiO_2$ | 12.25 | 13.5 | 14.4 | 14.3 | 13.9 |
| $Fe_2O_3$ | 7.10 | 1.6 | 82.6 | 1.4 | 85.5 |
| $TiO_2$ | 4.45 | 5.0 | 12.7 | 3.4 | 44.0 |

Chlorination with Carbon at 900°C

| | | | | | |
|---|---|---|---|---|---|
| $Al_2O_3$ | 58.70 | 74.4 | 4.75 | 74.1 | 11.91 |
| $SiO_2$ | 12.25 | 12.7 | 22.03 | 13.6 | 22.73 |
| $Fe_2O_3$ | 7.10 | 1.6 | 83.13 | 1.0 | 90.36 |
| $TiO_2$ | 4.45 | 1.0 | 82.69 | 0.8 | 87.50 |

EXAMPLE C

Using General Procedure 1, samples of 200/325 mesh diaspore clay were treated with chlorine at temperature of 1,000° C for 1 hour and 2 hours. The results of these tests are as follows:

TABLE VI

Chlorination Without Carbon at 1,000°C

| Constituent | Starting Ore, % | 1 Hour: Composition, % | Extraction, % | 2 Hours: Composition, % | Extraction, % |
|---|---|---|---|---|---|
| $Al_2O_3$ | 58.70 | 73.0 | 4.4 | 78.5 | 3.8 |
| $SiO_2$ | 12.25 | 15.7 | 1.6 | 14.7 | 13.9 |
| $Fe_2O_3$ | 7.10 | 0.9 | 90.1 | 0.8 | 92.0 |
| $TiO_2$ | 4.45 | 3.9 | 32.8 | 0.8 | 87.3 |

EXAMPLE D

Following General Procedure 2, Chlorination runs were made on 200/325 mesh diaspore clay samples at 900° and 1,000° C for one-half hour with carbon present (85 percent excess based on $Fe_2O_3$ and $TiO_2$). The results are set forth in Table VII.

TABLE VII.—CHLORINATION OF DIASPORE IN PRESENCE OF CARBON TESTS AT 900°C FOR ½ HOUR

| | Tests at 900°C for ½ hr. | | | Tests at 1000°C for ½ hr. | | |
|---|---|---|---|---|---|---|
| Constituent | Starting ore*, (%) | Product (%) | Extraction, (%) | Starting ore*, (%) | Product (%) | Extraction, (%) |
| $Al_2O_3$ | 54.6 | 56.7 | 4.58 | 54.6 | 58.5 | 4.30 |
| $SiO_2$ | 32.6 | 35.7 | Gain 0.61 | 32.6 | 36.8 | Gain 0.92 |
| $Fe_2O_3$ | 9.1 | 2.8 | 71.98 | 9.1 | 2.2 | 78.57 |
| $TiO_2$ | 3.3 | 1.4 | 60.61 | 3.3 | 1.2 | 68.18 |

* Analysis based on ore calcined 24 hours at 1000°C.

EXAMPLE E

In accordance with General Procedure 2 and using a small sample of 200/325 mesh diaspore clay, a test was run at 1,000° C for 2 hours using approximately 2 parts of argon to 1 part of chlorine with carbon (85± excess based on $Fe_2O_3$ and $TiO_2$). The total flow of chlorine after 2 hours was only a little more than that for one-half hour with pure chlorine. The results are as follows:

TABLE VIII.—EFFECT OF DILUTING CHLORINE

| Constituent | Starting ore, (%) | Pure Chlorine 1000°C ½ hour | | ⅓ Cl₂ + ⅔ Ar 1000°C 2 hours | |
|---|---|---|---|---|---|
| | | Analysis (%) | Extraction, (%) | Analysis (%) | Extraction, (%) |
| $Al_2O_3$ | 54.6 | 58.5 | 4.30 | 59.3 | 6.7 |
| $SiO_2$ | 32.6 | 36.8 | 0.92 | Gain 35.2 | 7.36 |
| $Fe_2O_3$ | 9.1 | 2.2 | 78.57 | 2.0 | 81.32 |
| $TiO_2$ | 3.3 | 1.2 | 68.18 | 1.4 | 63.64 |

EXAMPLE F

Following General Procedure 2, a test was run on a small particle size (200/325 mesh) sample of diaspore ore at 1,100° C for 2 hours. Carbon (85 percent excess based on $Fe_2O_3$ and $TiO_2$) was added and chlorine flow rates were the same as at 1,000° C. $Fe_2O_3$ extraction was improved over extraction at 1,000° C under same conditions while $TiO_2$ extraction remained about the same. The results are as follows:

TABLE IX

| Constituents | Starting Ore, % | Product % |
|---|---|---|
| $Al_2O_3$ | 63.2 | 72.2 |
| $SiO_2$ | 18.25 | 20.5 |
| $Fe_2O_3$ | 8.7 | 0.5 |
| $TiO_2$ | 4.6 | 1.0 |

EXAMPLE G

Employing General Procedure 2, a small sample of diaspore ore ground to a mesh of 230/325 was treated with bromine, with and without carbon (85 percent excess based on $Fe_2O_3$ and $TiO_2$) at 1,000° C. Little or no reaction occurred without carbon. The results are as follows:

TABLE X

| Constituent | Starting Ore, % | Test Conditions: Without Carbon Analysis, % | With Carbon Analysis, % |
|---|---|---|---|
| $Al_2O_3$ | 63.2 | 64.1 | 64.6 |
| $SiO_2$ | 18.25 | 16.7 | 19.4 |
| $Fe_2O_3$ | 8.7 | 8.6 | 0.7 |
| $TiO_2$ | 4.6 | 5.0 | 1.0 |

EXAMPLE H

Following General Procedure 2, a 20 gram sample of −100 mesh kyanite concentrate was chlorinated with carbon (85 percent excess based on $Fe_2O_3$ and $TiO_2$) at 1,000° C for 2 hours. Iron removal was exceptionally good with the product having only 0.1 percent $Fe_2O_3$. The results of this run are as follows:

TABLE XI

| Constituent | Starting Ore, % | Product: Analysis % | Extraction % |
|---|---|---|---|
| $Al_2O_3$ | 43.7 | 46.0 | 1.5 |
| $SiO_2$ | 52.0 | 52.0 | 3.6 |
| $Fe_2O_3$ | 1.1 | 0.1 | 90.9 |
| $TiO_2$ | 0.7 | 0.3 | 57.1 |

At temperatures of from about 650° C to about 900° C $TiO_2$ extraction with chlorine in the presence of carbon was markedly better than $TiO_2$ extraction with chlorine without carbon.

At 900° C with runs of 2 hours, iron extraction with chlorine and carbon is more effective than iron extraction with chlorine alone, although not as markedly so as with titanium.

From the foregoing data it can readily be seen that the chlorination or bromination of natural ores such as kyanite and diaspore in the presence of carbon substantially reduces the iron and titanium impurities in such ores and makes them suitable for further processing, especially the manufacture of aluminum-silicon alloys.

Other impurities occurring in natural ores, such as vanadium, chromium, nickel, manganese, sodium, potassium, calcium and magnesium, although generally occurring in considerably less amounts than iron and titanium, may also be reduced by the method.

The present invention provides a relatively simple method for effectively simultaneously reducing the iron and titanium content of alumina-silica ores to be subsequently carbothermically reduced or otherwise reduced for making aluminum-silicon alloys. If such ores did not contain titanium, they could be treated by physical beneficiation means which would usually be sufficient for iron reduction.

Although lower temperatures can be employed in reducing the iron content of the natural ore or clay, a temperature of at least about 650° C is essential for titanium reduction when using a carbonaceous reducing agent.

The present invention also provides a means for making titanium tetrachloride ($TiCl_4$) as the titanium tetrachloride formed during chlorination of the ore at 650° C or above is volatized and may be collected in any suitable manner.

The foregoing disclosure and description of the invention is illustrative and explanatory thereof and various changes in the treating procedure may be made within the scope of the appended claims without departing from the spirit of the invention.

What is claimed is:

1. A method of reducing the iron and titanium content of an alumina-silica ore containing over 50 percent alumina as well as substantial amounts of iron and titanium, said method being characterized by providing such ore in a particle size smaller than 100 mesh and mixed with an amount of carbon in excess of that needed to completely reduce its iron and titanium content, and heating such mixture in a non-fluidized bed to a temperature between about 650° and 900° C in the presence of chlorine or bromine to cause most of the iron and titanium in the ore to be driven off.

2. The combination of claim 1 in which the ore is diaspore, the particle size is less than 200 mesh, the heating temperature is about 750° C and is conducted in the presence of chlorine.

3. In the process of manufacturing an aluminum-silicon alloy by carbothermic reduction of a clay, the improvement according to which the clay contains over 50 percent alumina as well as large quantities of iron and titanium, and the clay is previously treated to reduce its iron and titanium content by the method of claim 1.

4. In the process of manufacturing an aluminum-silicon alloy by carbothermic reduction of a diaspore clay or ore, the improvement according to which the diaspore is previously treated to reduce its iron and titanium content by the method of claim 2.

5. A method of reducing the iron and titanium content of an alumina-silica ore containing over 50 percent alumina as well as substantial amounts of iron and titanium, said method being characterized by providing such ore in a particle size smaller than 100 mesh and mixed with an amount of carbon in excess of that needed to completely reduce its iron and titanium content, and heating such mixture to a temperature between about 650° and 1,200° C in the presence of bromine to cause most of the iron and titanium in the ore to be driven off.

* * * * *